(12) United States Patent
Kirwan (10) Patent No.: US 6,839,641 B1
(45) Date of Patent: Jan. 4, 2005

(54) AUTOMATED SYSTEM FOR RATING PIPE SEGMENTS IN A WATER DISTRIBUTION SYSTEM

(76) Inventor: Kevin B. Kirwan, 31 Center St., Rumson, NJ (US) 07760

(*) Notice: Subject to any disclaimer, the term of this patent is extended or adjusted under 35 U.S.C. 154(b) by 842 days.

(21) Appl. No.: 09/668,081

(22) Filed: Sep. 22, 2000

(51) Int. Cl.$^7$ ................................................ C02F 1/00
(52) U.S. Cl. ........................... 702/36; 702/22; 700/282; 700/271; 210/742; 210/656; 210/141; 210/634
(58) Field of Search .............................. 702/36, 22, 45, 702/50; 700/282, 271; 210/742, 656, 141, 660–662, 294; 73/40.5 R, 49.5

(56) References Cited

U.S. PATENT DOCUMENTS

| | | | | |
|---|---|---|---|---|
| 4,830,757 A | * | 5/1989 | Lynch et al. | 210/742 |
| 5,132,904 A | * | 7/1992 | Lamp | 700/282 |
| 5,993,662 A | * | 11/1999 | Garr et al. | 210/656 |
| 6,332,110 B1 | * | 12/2001 | Wolfe | 702/22 |
| 6,560,543 B2 | * | 5/2003 | Wolfe et al. | 702/22 |

OTHER PUBLICATIONS

Specialized Systems Software, LLC, web site; printout from web site: http://www.specializedsystemssw.com/, printout date: Apr. 18, 2002, original web posting date and product availability date: unknown, 6 pages.

Firehouse Software web site, printout from web site: http://firehousesoftware.com, Visionary Systems, Ltd., printout date: Apr. 18, 2002, original web posting date and product availability date: unknown, 6 pages.

The Hose Monster/TrackOne™ Advantage, web sites: printout from web site: http://www.hosemonster.com, http://www.flowtest.com, Hydro Flow Products, Inc., printout dates: Apr. 17–18, 2002, original web posting dates and product availability dates: unknown, 9 pages.

* cited by examiner

*Primary Examiner*—John Barlow
*Assistant Examiner*—Hien Vo
(74) *Attorney, Agent, or Firm*—Akin Gump Strauss Hauer & Feld, LLP (57) ABSTRACT

A computer-implemented process rates pipe segments in a water distribution system, the water distribution system including pipe segments and hydrants. Information gathered from maintenance tasks and inspections performed on the pipe segments and hydrants within the water distribution system is stored in an electronic database. The information in the electronic database is analyzed for a specified period of time to determine the presence of water quality factors and service interruption factors. Points are assigned to the pipe segments based on the presence of the water quality factors and service interruption factors. The pipe segments are rated based on the total points assigned to the pipe segments. The pipe segment ratings can be used for prioritizing the replacement of pipe segments in the water distribution system.

84 Claims, 11 Drawing Sheets

AUTOMATED SYSTEM FOR RATING PIPE SEGMENTS IN A WATER DISTRIBUTION SYSTEM

COPYRIGHT NOTICE AND AUTHORIZATION

Portion of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates generally to a process of rating pipe segments within a water distribution and transmission system (hereinafter a water distribution system), and more particularly to an automated system of rating pipe segments based on the analysis of data relating to maintenance tasks and inspections performed on components of the water distribution system stored within an electronic database.

Operators of water distribution systems, such as water utilities, generate tremendous amounts of data regarding the operation of their water distribution systems. For example, a typical water distribution system can consist of over 1,300 miles of pipe segments as well as more than 5,600 hydrants. In any given year, over 9,000 different maintenance tasks may be performed on the pipes segments and hydrants in the distribution system and each of the hydrants may also be inspected during that year.

Currently, however, the operators cannot and do not take advantage of the tremendously valuable data that can be generated from the maintenance tasks and inspections performed on the water distribution system. First, the practice among operators today is to keep manual records. Such record keeping makes it laborious and inefficient to maintain and analyze maintenance and inspection data to rate pipe segments. In particular, capital budgets for the replacement of pipe segments within a particular distribution system presently are not quantitatively or qualitatively evaluated to determine the segments that impacted operations from an array of perspectives due to the magnitude of the data retrieval, correlation, assessment and prioritization task that would be required in such an analysis.

Additionally, the use of manual record keeping makes it extremely difficult for operators to use hydrant inspection data in the rating of pipe segments. For example, there is a present inability to correlate factors such as inadequate hydrant capacities and hydrant chlorine residuals that are below range to a particular pipe segment.

There is thus a need for an automated system for rating pipe segments based upon a quantitative and qualitative analysis of maintenance and inspection data stored in an electronic database to determine the presence of water quality factors and service interruption factors such as, for example, the history of pipe segment breaks, the material of construction of pipe segments, the size of pipe segments, the total time of shut down for repairs, the total number of customers affected and related hydrant performance for a pipe segment.

There are no known processes that allow operators of water distribution systems to analyze and quantify the reliability of pipe segments within a water distribution system at any point in time by querying data stored in an electronic database gathered from maintenance tasks and inspections performed on the pipe segments and hydrants within the water distribution system. The present invention provides such a process.

SUMMARY OF THE INVENTION

Briefly stated, the present invention provides an automated computer-implemented method of rating pipe segments in a water distribution system. The water distribution system includes pipe segments and hydrants. In the method, information gathered from maintenance tasks and inspections performed on the pipe segments and hydrants within the water distribution system is stored in an electronic database. The information in the electronic database is analyzed for a specified period of time to determine the presence of water quality factors and service interruption factors. Next, points are assigned to the pipe segments based on the presence of the water quality factors and service interruption factors. Finally, the pipe segments are rated based on the total points assigned to the pipe segments.

Examples of the service interruption factors include that: the maintenance task performed on a pipe segment was to fix a break in the pipe segment; the number of pipe segment breaks for a particular street or pipe segment exceeds a specified value; the diameter of a pipe segment is less than a threshold value; the pipe segment is made of a particular material; more than a specified number of customers of the water distribution system were affected by a maintenance task; and a pipe segment had to be shut off for more than a specified period of time during the performance of a maintenance task.

Examples of the water quality factors include: that a hydrant has less than a specified flow rate for a particular street or pipe segment; that a hydrant has a chlorine residual that is less than a specified range; and the number of discolored water complaints and low pressure complaints received for a particular street or pipe segment.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings an embodiment that is presently preferred. It should be understood, however, that the invention is not limited to the precise arrangements and instrumentalities shown. In the drawings.

DETAILED DESCRIPTION OF THE INVENTION

Certain terminology is used herein for convenience only and is not to be taken as a limitation on the present invention. In the drawings, the same reference numerals are employed for designating the same elements throughout the several figures.

The present invention is described in the context of a system used by an entity that operates a water distribution system, including pipe segments and hydrants, such as, for example, a water utility, a municipal or governmental authority, department or commission, an association or contract operators. The entity is referred to herein as an "operator," and the system is referred to as a "pipe rating system."

Figure 1:
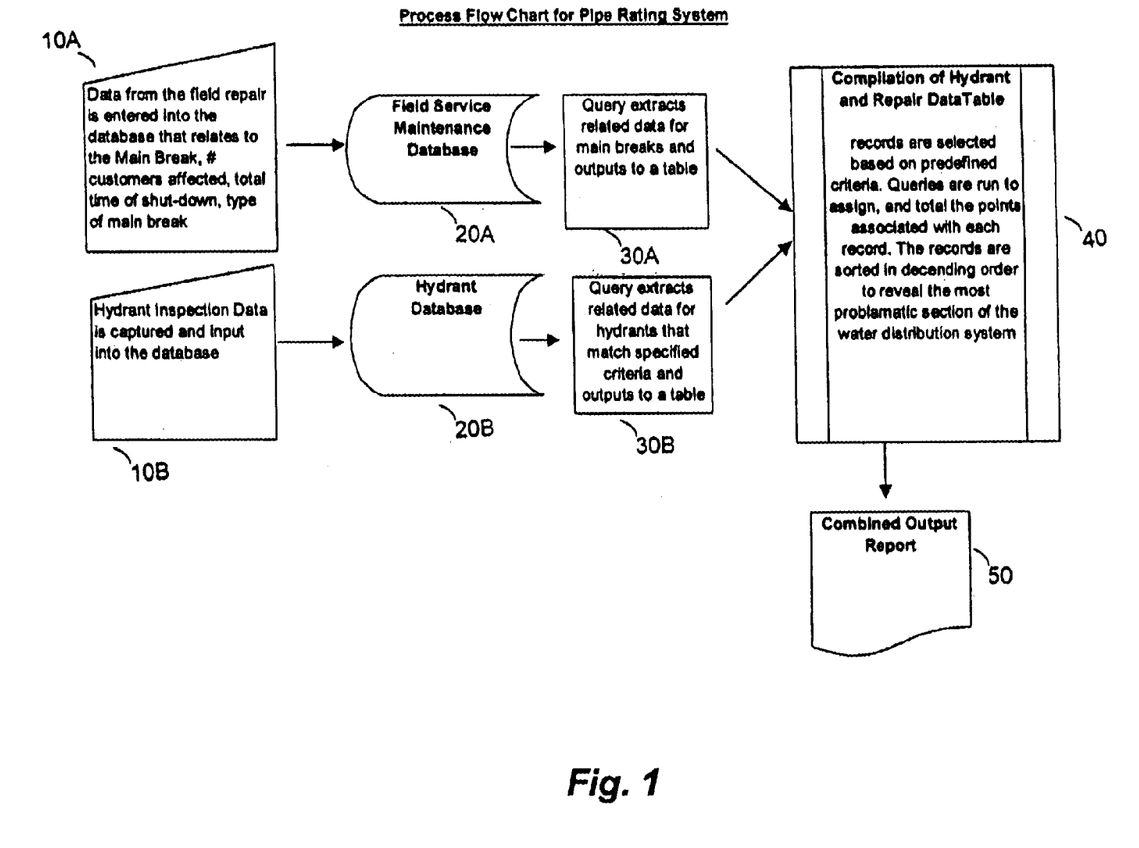
FIG. 1 is a functional flowchart of the steps in the process of a preferred embodiment of the present invention.
Figure 2:
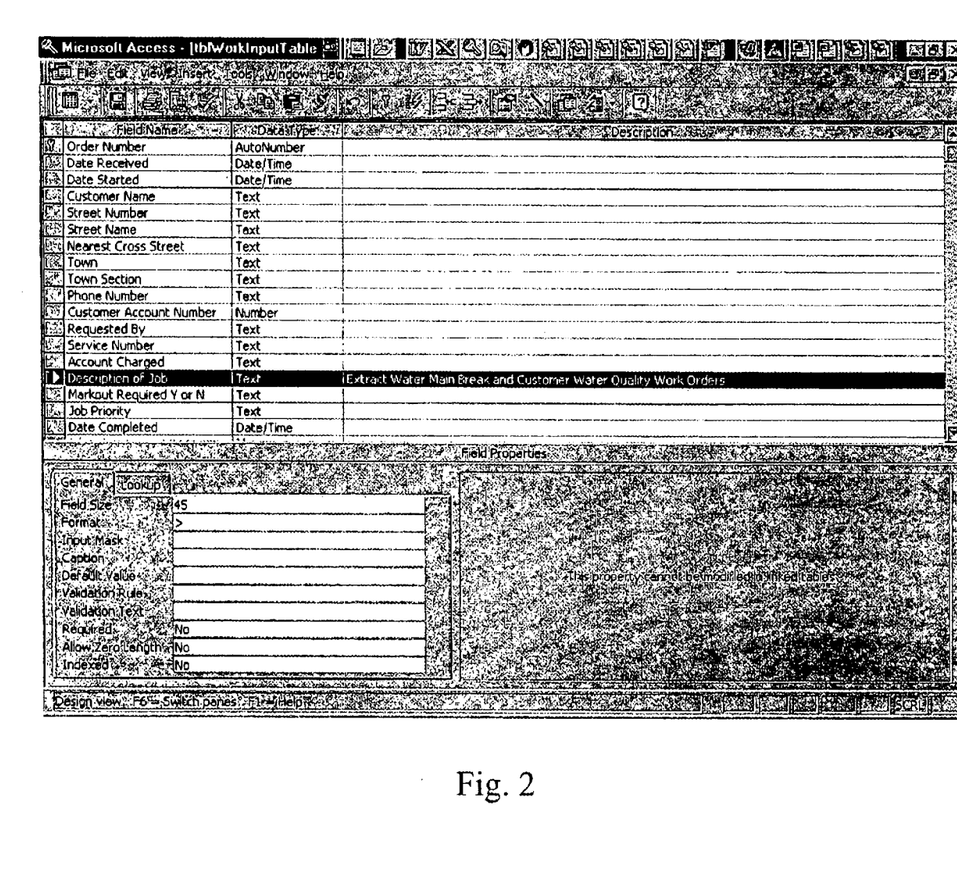
FIG. 2 is a table showing some of the fields in a field service maintenance database of a preferred embodiment of the present invention.
Figure 3:
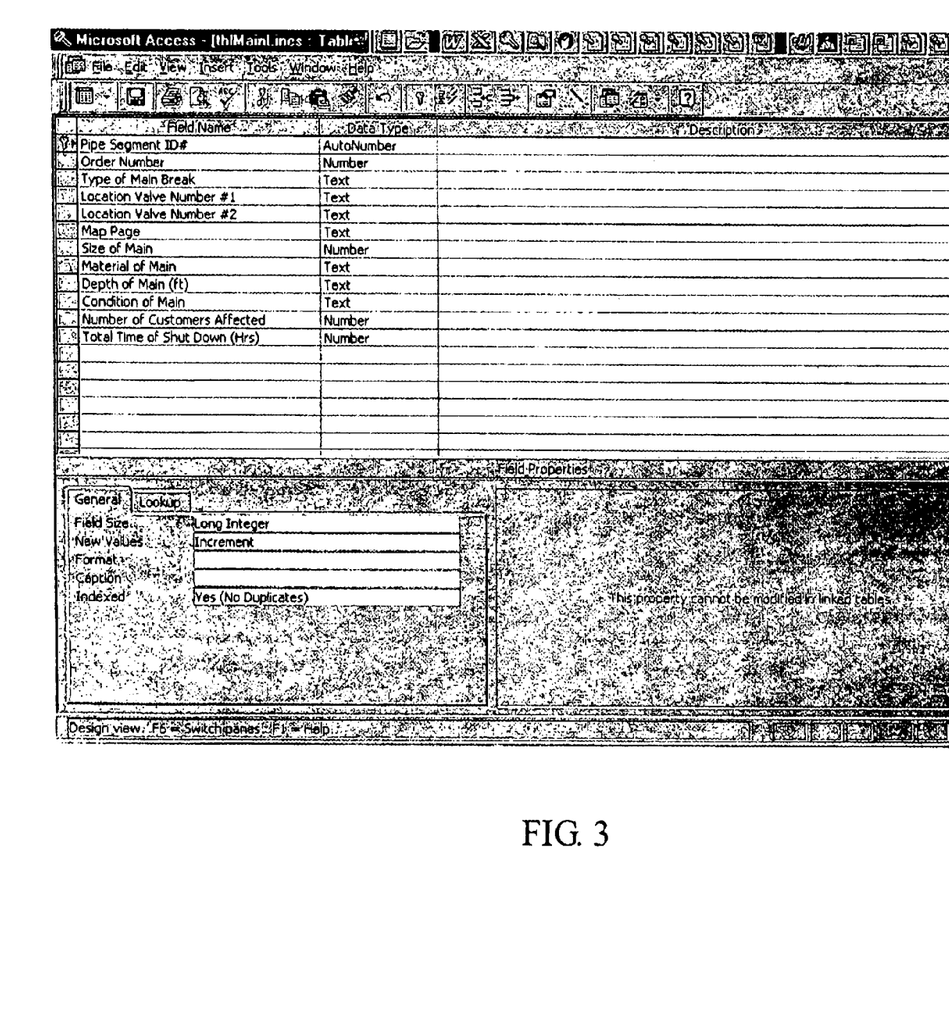
FIG. 3 is a table showing additional fields in a field service maintenance database of a preferred embodiment of the present invention.

Turning to FIG. 1, a functional flowchart of the steps in the process of a preferred embodiment of the pipe rating system of the present invention is shown. First, in step 10A, data taken from maintenance tasks performed within a water distribution system is stored in a field service maintenance database 20A. FIG. 2 shows a representative list of the information captured from each maintenance task. If the maintenance task is to repair a pipe segment, additional data is captured. FIG. 3 shows a representative list of the information captured from a pipe segment repair. Similarly, in step 10B, data taken from inspections performed on hydrants within the water distribution system is stored in a hydrant database 20B. FIG. 3 shows a representative list of the information captured from each inspection. The data gathered during these steps will be explained in more detail below with an example of the pipe rating system.

The field service maintenance database 20A and the hydrant database 20B can be constructed using any database software running on any computer hardware. Preferably, the databases are constructed using Microsoft Access running on a personal computer. Moreover, although the field service maintenance database 20A and the hydrant database 20B are shown as different databases, they could be combined into a single database without departing from the spirit or scope of the invention. Additionally, the information can be entered into the database using any means. For example, the information can be entered from paper records documenting the maintenance tasks and inspections. Alternatively, the service technicians performing the maintenance tasks and inspections can enter information into computers, such as laptops or personal digital assistants (PDA's), in the field. This data can then be synchronized with the field service maintenance database 20A and the hydrant database 20B either remotely from the field or when the technician returns to the office.

In steps 30A and 30B, the field service maintenance database 20A and the hydrant database 20B are respectively queried pursuant to predefined criteria to produce a data table 40. The data table 40 combines information from both the field service maintenance database 20A and the hydrant database 20B into a single table containing records grouped by pipe segment, street and municipality. The predefined criteria are used to rate the pipe segments within the water distribution system. For example, the operator may be interested in data for pipe segments from a specified period of time (e.g., the last 6 months, the last year, etc.) indicating the presence of various water quality factors and service interruption factors. By finding pipe segments that have shown problems with water quality and/or service interruptions, the operator can plan its capital budget with respect to pipe segment maintenance and strategic replacement. Various water quality factors and service interruption factors that are presently preferred are discussed in the example below.

The queries run in steps 30A and 30B add records to the data table 40 that meet the predefined criteria—i.e., they contain the water quality factors and/or service interruption factors of interest. In addition, the queries assign points to the records based on the presence of the water quality factors and service interruption factors (e.g., 2 points for factor A and 1 point for factor B). In this way, the various water quality factors and service interruption factors can be weighted to provide more emphasis to certain factors.

The data table 40 includes an entry for each pipe segment showing the total points accumulated for that pipe segment based on the predefined criteria. The data table 40 can then be sorted by the total points field to show a rank ordering or rating of the pipe segments based on the user-defined criteria. For example, if the data table 40 is sorted in descending order, the first pipe segment in the data table 40 will have received the most points. An output report showing the pipe segment ratings can then be printed out as shown in step 50. The operator can then use the sorted pipe segment ratings to analyze and quantify the reliability of the pipe segments within the water distribution system. Additionally, the operator can prioritize the repair or replacement of pipe segments.

A presently preferred example of the pipe rating system will now be discussed, in which the pipe rating system is used to find the most problematic pipe segments with the water distribution system for determining the appropriation of capital dollars.

Figure 5:
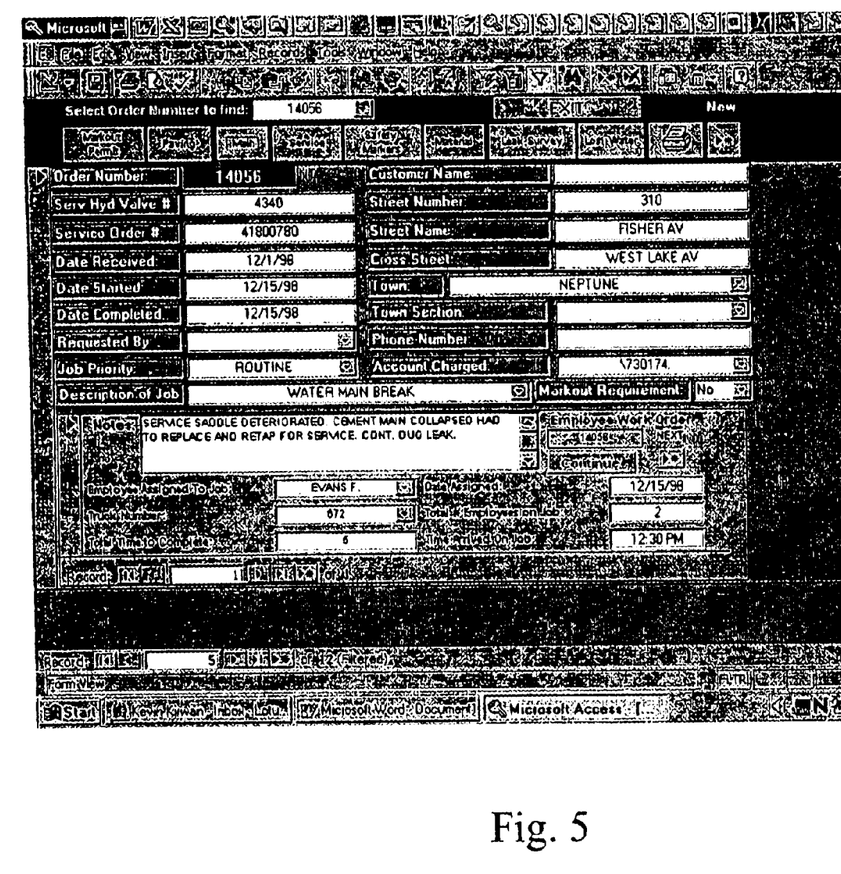
FIG. 5 is a sample user input screen for entering data into a field service maintenance database of a preferred embodiment of the present invention.

Each maintenance task performed in the water distribution system is recorded in the field service maintenance database 20A with a unique identification number assigned to each order. FIG. 5 shows an input screen into which information regarding the order is entered. The information entered is designed to capture the information necessary for prioritizing pipe segment replacements. Of course, additional fields can be added or existing fields modified without departing from the spirit or scope of the present invention.

Figure 6:
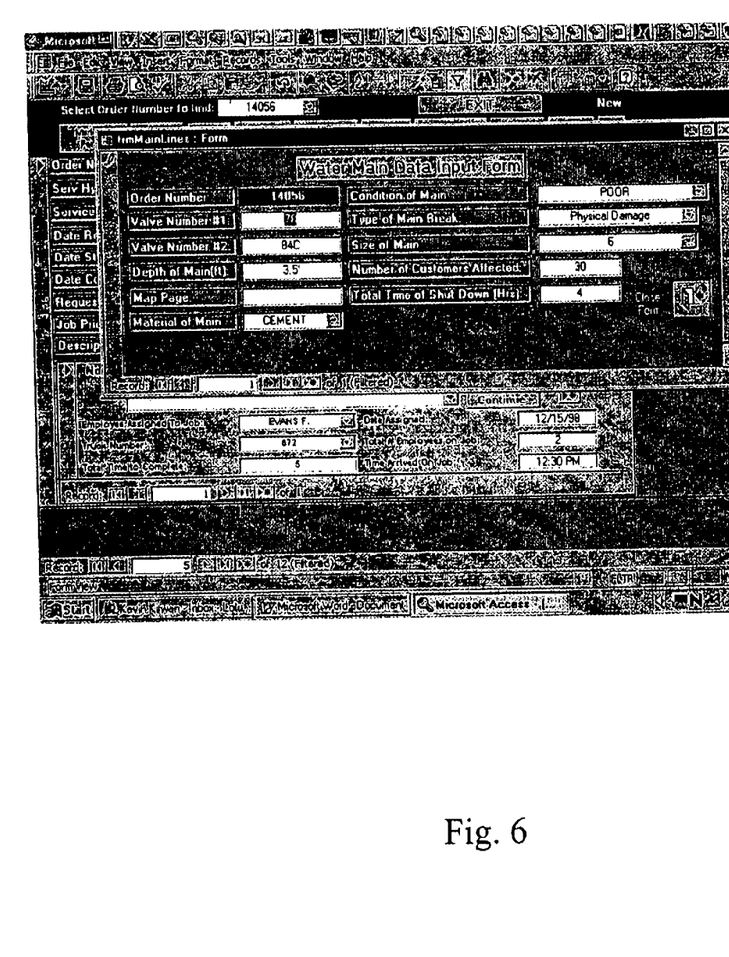
FIG. 6 is a sample user input screen for entering data into a field service maintenance database of a preferred embodiment of the present invention.

When a work order is generated for a service repair pipe segment repair, additional information is captured. This information, which is of primary significance to the pipe rating system, includes:

(1) Size (e.g., diameter) of the pipe segment
(2) Between which two valves did the break occur
(3) Depth of the pipe segment
(4) Material from which the pipe segment is made
(5) Number of customers affected
(6) Total time of shut-down
(7) Observed condition of the pipe segment FIG. 6 shows an input screen into which the additional information regarding the service repair or pipe segment repair is entered.

Figure 7:
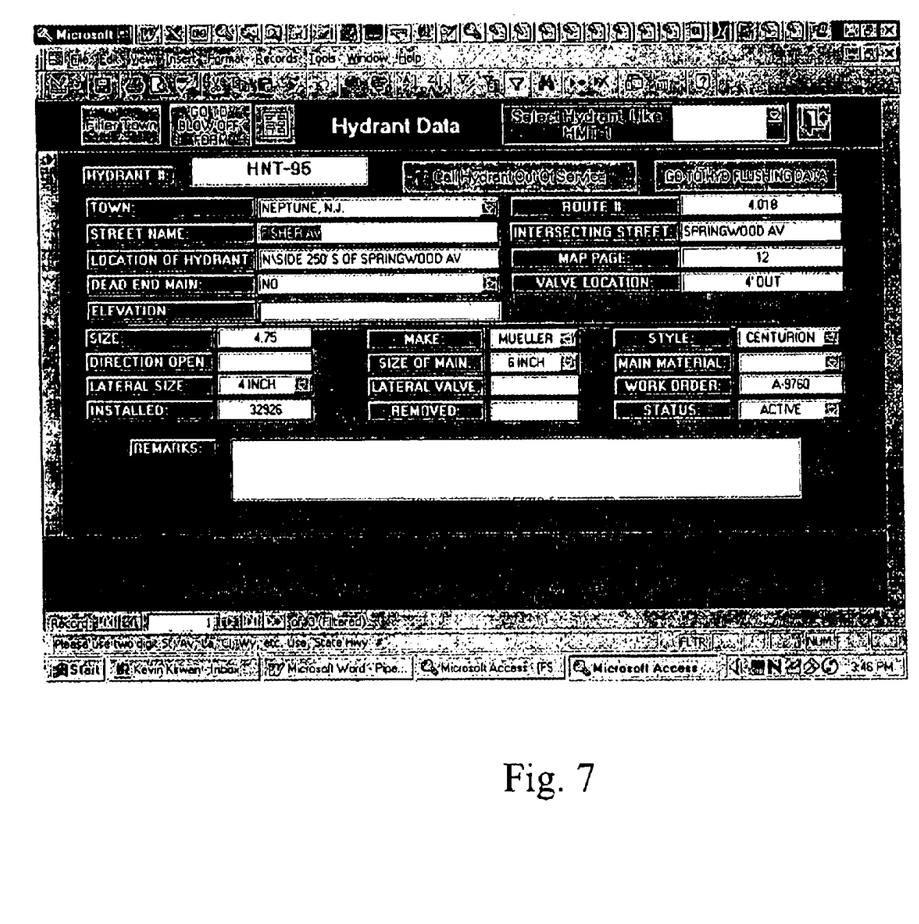
FIG. 7 is a sample user input screen for entering data into a hydrant database of a preferred embodiment of the present invention.
Figure 8:
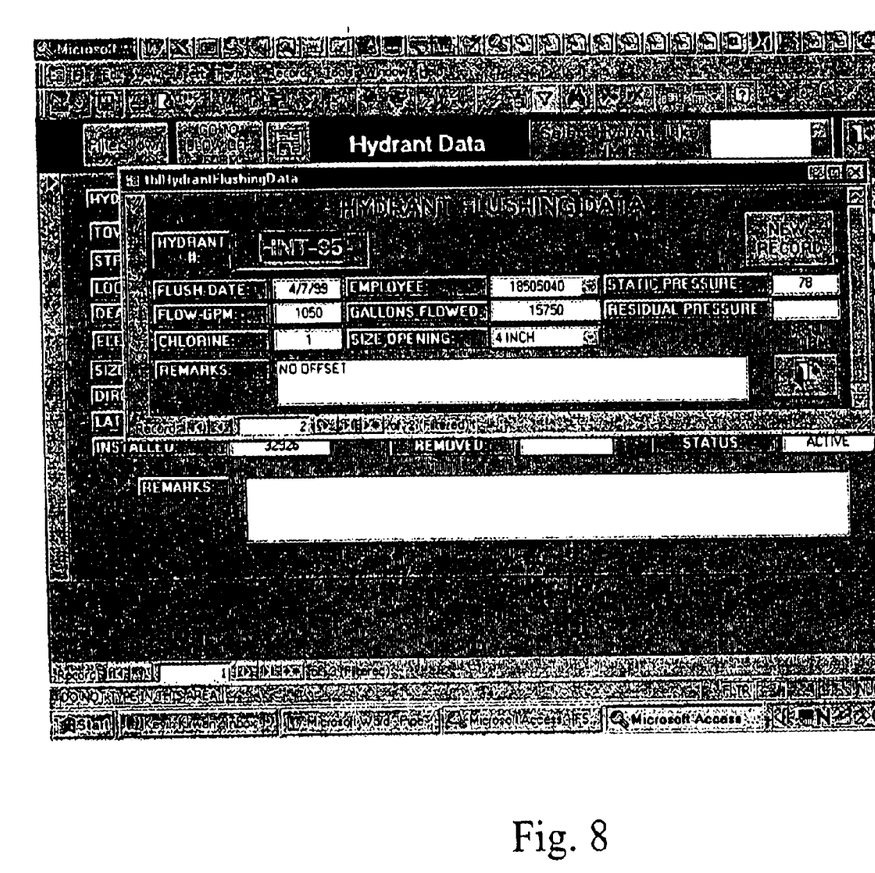
FIG. 8 is a sample user input screen for entering data into a hydrant database of a preferred embodiment of the present invention.

Complete inspection records of the hydrants in the water distribution system, including complete flushing records, are maintained within the hydrant database 20B, which can be linked to the field service maintenance database 20A by fields such as street and town name or a unique pipe segment identification number or code. As most operators are required to periodically inspect hydrants, the hydrant database 20B manages this work activity in addition to collecting data for use by the pipe rating system. The entire hydrant hydraulic performance and water quality information is stored within the hydrant database 20B from which all necessary information and trends are easily analyzed and evaluated with the repair records in the field service maintenance database 20A. The flow capacity and chlorine residual measurements taken at the hydrants are particularly important to the pipe rating system. FIGS. 7 and 8 show input screens into which information regarding hydrant inspections is entered.

The pipe rating system analyzes the data in the field service maintenance database 20A and the hydrant database 20B according to a set of predefined criteria to rank order the pipe segments in the water distribution system to determine the most problematic pipe segments. Various factors relating to water quality and service interruptions have been discovered to be indicators of poor pipe segments. In particular, recurring pipe segment breaks, pressure and discolored water complaints from users of the water distribution system, less than desirable chlorine residuals and diminished flow capacities from hydrants all distinguish those areas that may require system improvement.

Figure 9:
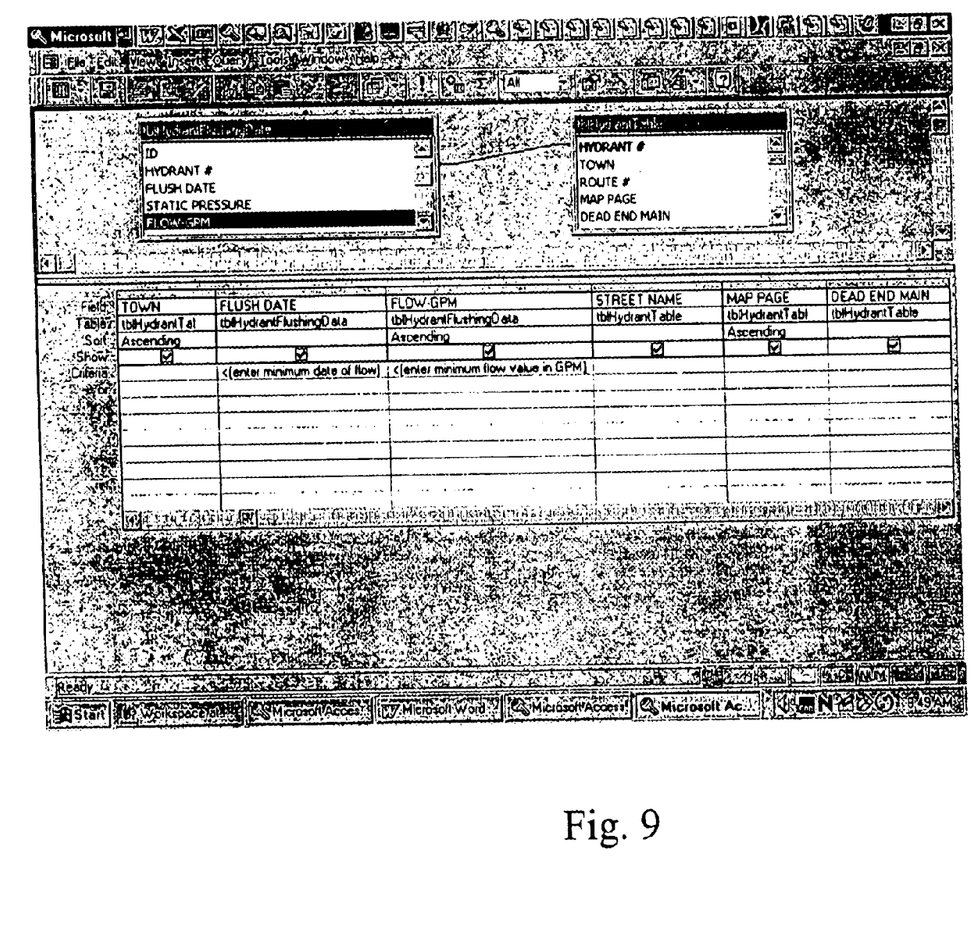
FIG. 9 is a make-table query used to extract information from a hydrant database into a data table in a preferred embodiment of the present invention.

To generate a rank ordered listing of the pipe segment ratings, a data table 40 must be created that contains all of the relevant records of interest from both the field service maintenance database 20A and the hydrant database 20B. From the hydrant database 20B, a query of the inspection records identifies those hydrants that are performing at a sub-standard level—e.g., the hydrant has less than a specified flow rate after a particular inspection date or has an unacceptable chlorine residual. For example, using Microsoft Access, "make table queries" are used to extract the information from the hydrant database 20B into the data table 40. FIG. 9 shows a make-table query that extracts those hydrant records that have less than a specified flow after a particular inspection date. A similar query would be used to extract those hydrant records that have a chlorine residual that is below range. Additional queries could also be generated based on additional criteria linking hydrant data to pipe segment performance.

Data from the field service maintenance database 20A is also added to the data table 40 using make-table queries. Preferably, all records where the Description of Job field (see FIG. 2) is a pipe segment break or a customer water quality complaint (e.g., discolored water or low pressure) are extracted to the data table 40.

Figure 4:
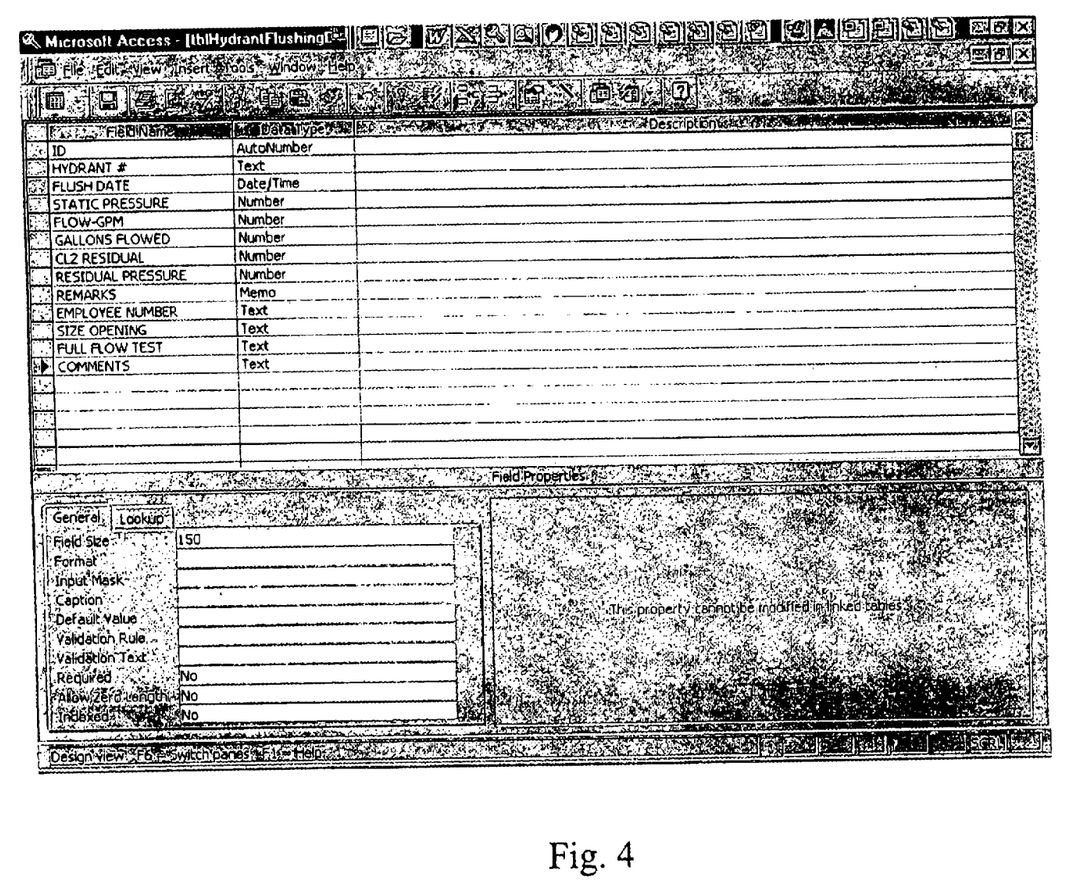
FIG. 4 is a table showing the fields in a hydrant database of a preferred embodiment of the present invention.
Figure 10:
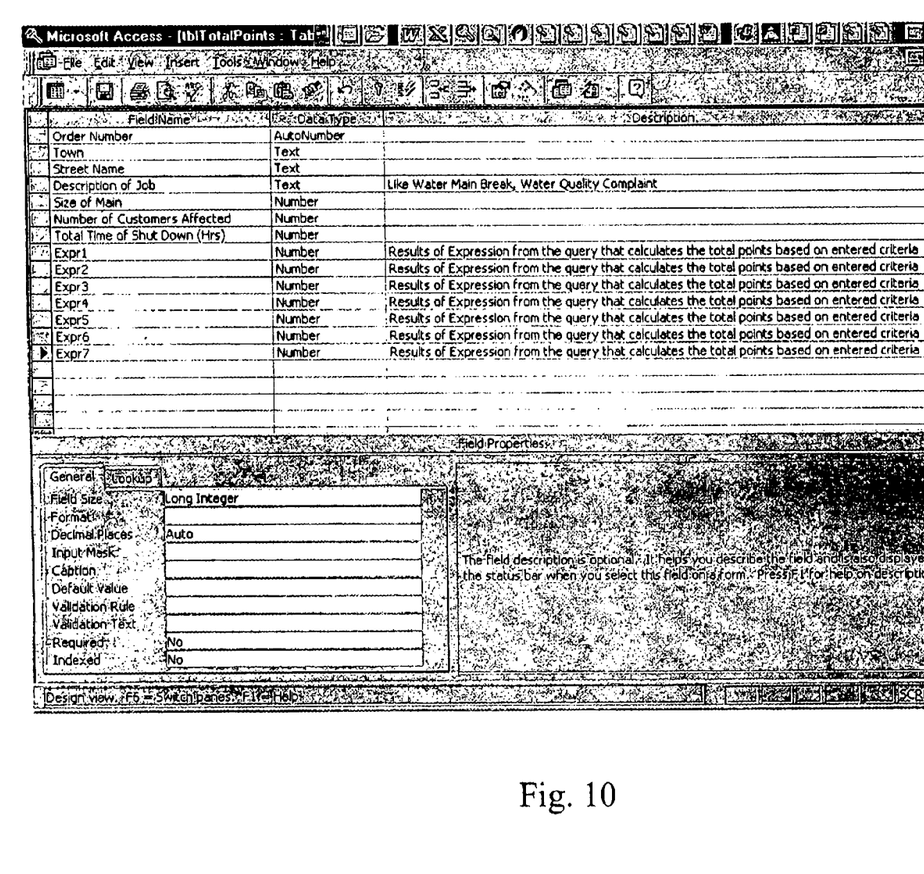
FIG. 10 is a table showing the fields in a data table of a preferred embodiment of the present invention.

FIG. 10 shows the fields in the data table 40. As shown in FIG. 10, only a subset of the fields from the field service maintenance database 20A and the hydrant database 20B are extracted into the data table 40 (see FIGS. 2-4). Moreover, the fields Expr1 through Expr7 are evaluated expressions that are calculated based on information taken from the field service maintenance database 20A and the hydrant database 20B. These fields are used to assign points to particular pipe segments based on the water quality factors and service interruption factors mentioned above. For example, the following expressions can be used to create the data table 40:

Expr1: IIf([DESCRIPTION OF JOB]="WATER MAIN BREAK",1,0)

[If the order is a Water Main Break than 1 point is given]

Expr2: IIf([Size of Main]<4.1,1,0)

[If the main size is less than 4" then an additional point is added to the accumulated rating]

Expr3: IIf([Number of Customers Affected]>10 Or ([Total Time of Shut Down (Hrs)])>4,2,0)

[If the number of customers affected is greater than 10 or the shut-down was greater than 4 hours then 2 additional points are given to the main break rating]

Expr4: IIf([DESCRIPTION OF JOB]="H",2,0)

[If a hydrant has less than 700 gpm flow then 2 points]

Expr5: IIf([Chlorine Residual Range Comparision]="Below Range",2,0)

[If a hydrant's inspected chlorine residual is below range in comparison to pre-established theoretical minimums then 2 points]

Expr6: IIf([DESCRIPTION OF JOB]="PRESSURE COMPLAINT",1,0)

[If the order is a customer pressure complaint than 1 point is assigned]

Expr7: [expr1]+[expr2]+[expr3]+[expr4+][expr5]+[expr6]

[This expression totals the accumulated points]

Additional expressions could also be used in creating the data table 40. For example, points could be added if: the order is for a discolored water complaint; the number of pipe segment breaks for a particular street or pipe segment exceeds a specified value, such as 3; and the pipe segment is made of a particular material such as galvanized steel or transite (i.e., cement type); the number of people required to perform a pipe segment break exceeds a specified value such as 4; the type of street in which the pipe segment is installed is a county or state road (as opposed to a local or private road or an easement); the material of the street which was excavated in order to perform the pipe segment repair is concrete or brick; the soil in which the pipe segment is installed is aggressive (i.e., has a non-neutral pH and/or contributes to a deterioration of the outer surface of the pipe segment).

Figure 11:
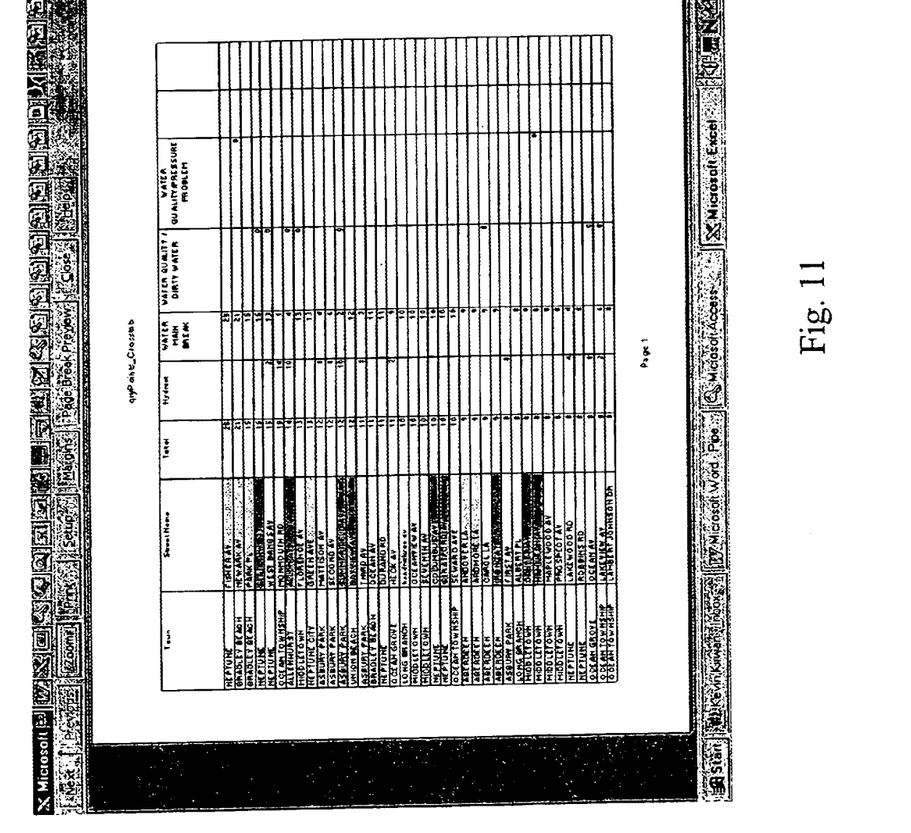
FIG. 11 is a sample output screen showing pipe segment ratings generated by a preferred embodiment of the present invention.

After the evaluation of the above expressions, the data table 40 can be sorted in descending order on the total points field in order to identify those pipe segments that are most likely to be problematic and thus are most in need of replacement. FIG. 11 shows a sample printout of the data table sorted by total points.

The pipe rating system thus provides a means to quantitatively and qualitatively identify those pipe segments within a water distribution system that potentially require replacement. This enables an operator to efficiently allocate its capital expenditures.

Additional or different water quality or service interruption factors can be used with the pipe rating system without departing from the spirit or scope of the present invention. For example, the criteria will vary depending upon the pipe segment characteristics that an operator is trying to rank. Additionally, the replacement prioritization discussed above can be improved by adding factors to ascertain if a certain operating condition or event, rather than a problematic pipe segment, precipitated a main break or less than desirable inspection value. For example, additional factors to be evaluated include:

(1) Valves operated during a "shut down" for repair and not restored to normal position.

(2) Sudden changes in chlorine values for a particular hydrant that indicate an operational change, typically in a valve position or tank operation.

(3) Sudden changes in flow values for a particular hydrant and not consistent with other hydrants on the same pipe segment.

(4) Pump and valve operations within the gradient—i.e.: cycling, valve closure speeds, or large production swings can be the causal factor of a pipe segment failure.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

What is claimed is:

1. A computer-implemented method of rating pipe segments in a water distribution system, the water distribution system including pipe segments and hydrants, the method comprising:
   (a) storing in an electronic database information gathered from maintenance tasks and inspections performed on the pipe segments and hydrants within the water distnrbution system;
   (b) analyzing the information in the electronic database for a specified period of time to determine the presence of water quality factors and service interruption factors;
   (c) assigning points to the pipe segments based on the presence of the water quality factors and service interruption factors; and
   (d) rating the pipe segments based on the total points assigned to the pipe segments.

2. The method of claim 1 wherein the pipe segments are rated by rank ordering the pipe segments based on the total points assigned to the pipe segments, with the pipe segment having the most total points ranked first.

3. The method of claim 2 wherein the pipe segment rating is used for prioritizing the replacement of pipe segments, the method further comprising:
   (e) using the rank ordering of pipe segments to determine priority of replacement, with the pipe segment having the most total points ranked first for replacement.

4. The method of claim 1 further comprising:
   (e) displaying on the computer the pipe segment ratings.

5. The method claim 1 further comprising:
   (e) printing a list of the pipe segment ratings.

6. The method of claim 1 wherein the specified period of time is one year.

7. The method of claim 1 wherein one of the service interruption factors is that the maintenance task performed on a pipe segment was to fix a break in the pipe segment.

8. The method of claim 1 wherein one of the service interruption factors is that the number of pipe segment breaks for a particular street or pipe segment exceeds a specified value.

9. The method of claim 8 wherein the specified value is 3.

10. The method of claim 1 wherein one of the service interruption factors is that the diameter of a pipe segment is less than a threshold value.

11. The method of claim 10 wherein the threshold value is 4 inches.

12. The method of claim 1 wherein one of the service interruption factors is that more than a specified number of customers of the water distribution system were affected by a maintenance task.

13. The method of claim 12 wherein the specified number of customers is 10.

14. The method of claim 1 wherein one of the service interruption factors is that a pipe segment had to be shut off for more than a specified period of time during the performance of a maintenance task.

15. The method of claim 14 wherein the specified period of time is 4 hours.

16. The method of claim 1 wherein one of the water quality factors is that a hydrant has less than a specified flow rate for a particular street or pipe segment.

17. The method of claim 16 wherein the specified flow rate is 700 gallons per minute.

18. The method of claim 1 wherein one of the water quality factors is that a hydrant has a chlorine residual that is less than a specified range.

19. The method of claim 18 wherein the specified range is based on the distance and flow rate between the hydrant and a chlorinating source.

20. The method of claim 1 wherein one of the water quality factors is the number of discolored water complaints received for a particular street or pipe segment.

21. The method of claim 1 wherein one of the water quality factors is the number of pressure complaints received for a particular street or pipe segment.

22. The method of claim 1 wherein one of the service interruption factors is that a pipe segment is made from a particular material.

23. The method of claim 22 wherein the material is galvanized steel.

24. The method of claim 22 wherein the material is transite.

25. The method of claim 1 wherein one of the service interruption factors is that a number of people required to perform a pipe segment break exceeds a specified value.

26. The method of claim 1 wherein one of the service interruption factors is that a pipe segment is installed in a county or state road.

27. The method of claim 1 wherein one of the service interruption factors is that a street which was excavated in order to perform a pipe segment repair is made from concrete or brick.

28. The method of claim 1 wherein one of the service interruption factors is that a pipe segment is installed in soil that is aggressive.

29. An article of manufacture for rating pipe segments in a water distribution system, the water distribution system including pipe segments and hydrants, the article of manufacture comprising a computer-readable medium holding computer-executable instructions for performing a method comprising:
   (a) storing in an electronic database information gathered from maintenance tasks and inspections performed on the pipe segments and hydrants within the water distribution system;
   (b) analyzing the information in the electronic database for a specified period of time to determine the presence of water quality factors and service interruption factors;
   (c) assigning points to the pipe segments based on the presence of the water quality factors and service interruption factors; and
   (d) rating the pipe segments based on the total points assigned to the pipe segments.

30. The article of manufacture of claim 29 wherein the pipe segments are rated by rank ordering the pipe segments based on the total points assigned to the pipe segments, with the pipe segment having the most total points ranked first.

31. The article of manufacture of claim 30 wherein the pipe segment rating is used for prioritizing the replacement of pipe segments, and the computer-executable instructions perform a method further comprising:
(e) using the rank ordering of pipe segments to determine priority of replacement, with the pipe segment having the most total points ranked first for replacement.

32. The article of manufacture of claim 29 wherein the computer-executable instructions perform a method further comprising:
(e) displaying on the computer the pipe segment ratings.

33. The article of manufacture of claim 29 wherein the computer-executable instructions perform a method further comprising:
(e) printing a list of the pipe segment ratings.

34. The article of manufacture of claim 29 wherein the specified period of time is one year.

35. The article of manufacture of claim 29 wherein one of the service interruption factors is that the maintenance task performed on a pipe segment was to fix a break in the pipe segment.

36. The article of manufacture of claim 29 wherein one of the service interruption factors is that the number of pipe segment breaks for a particular street or pipe segment exceeds a specified value.

37. The article of manufacture of claim 36 wherein the specified value is 3.

38. The article of manufacture of claim 29 wherein one of the service interruption factors is that the diameter of a pipe segment is less than a threshold value.

39. The article of manufacture of claim 38 wherein the threshold value is 4 inches.

40. The article of manufacture of claim 29 wherein one of the service interruption factors is that more than a specified number of customers of the water distribution system were affected by a maintenance task.

41. The article of manufacture of claim 40 wherein the specified number of customers is 10.

42. The article of manufacture of claim 29 wherein one of the service interruption factors is that a pipe segment had to be shut off for more than a specified period of time during the performance of a maintenance task.

43. The article of manufacture of claim 42 wherein the specified period of time is 4 hours.

44. The article of manufacture of claim 29 wherein one of the water quality factors is that a hydrant has less than a specified flow rate for a particular street or pipe segment.

45. The article of manufacture of claim 44 wherein the specified flow rate is 700 gallons per minute.

46. The article of manufacture of claim 29 wherein one of the water quality factors is that a hydrant has a chlorine residual that is less than a specified range.

47. The article of manufacture of claim 46 wherein the specified range is based on the distance and flow rate between the hydrant and a chlorinating source.

48. The article of manufacture of claim 29 wherein one of the water quality factors is the number of discolored water complaints received for a particular street or pipe segment.

49. The article of manufacture of claim 29 wherein one of the water quality factors is the number of pressure complaints received for a particular street or pipe segment.

50. The article of manufacture of claim 29 wherein one of the service interruption factors is that a pipe segment is made from a particular material.

51. The article of manufacture of claim 50 wherein the material is galvanized steel.

52. The article of manufacture of claim 50 wherein the material is transite.

53. The article of manufacture of claim 29 wherein one of the service interruption factors is that a number of people required to perform a pipe segment break exceeds a specified value.

54. The article of manufacture of claim 29 wherein one of the service interruption factors is that a pipe segment is installed in a county or state road.

55. The article of manufacture of claim 29 wherein one of the service interruption factors is that a street which was excavated in order to perform a pipe segment repair is made from concrete or brick.

56. The article of manufacture of claim 29 wherein one of the service interruption factors is that a pipe segment is installed in soil that is aggressive.

57. A computer-implemented apparatus for rating pipe segments in a water distribution system, the water distribution system including pipe segments and hydrants, the apparatus comprising:
(a) means for storing in an electronic database information gathered from maintenance tasks and inspections performed on the pipe segments and hydrants within the water distribution system;
(b) means for analyzing the information in the electronic database for a specified period of time to determine the presence of water quality factors and service interruption factors;
(c) means for assigning points to the pipe segments based on the presence of the water quality factors and service interruption factors; and
(d) means for rating the pipe segments based on the total points assigned to the pipe segments.

58. An apparatus according to claim 57 wherein the pipe segments are rated by rank ordering the pipe segments based on the total points assigned to the pipe segments, with the pipe segment having the most total points ranked first.

59. An apparatus according to claim 58 wherein the pipe segment rating is used for prioritizing the replacement of pipe segments, the apparatus further comprising:
(e) means for using the rank ordering of pipe segments to determine priority of replacement, with the pipe segment having the most total points ranked first for replacement.

60. An apparatus according to claim 57 further comprising:
(e) means for displaying on the computer the pipe segment ratings.

61. An apparatus according to claim 57 further comprising:
(e) means for printing a list of the pipe segment ratings.

62. An apparatus according to claim 57 wherein the specified period of time is one year.

63. An apparatus according to claim 57 wherein one of the service interruption factors is that the maintenance task performed on a pipe segment was to fix a break in the pipe segment.

64. An apparatus according to claim 57 wherein one of the service interruption factors is that the number of pipe segment breaks for a particular street or pipe segment exceeds a specified value.

65. An apparatus according to claim 64 wherein the specified value is 3.

66. An apparatus according to claim 57 wherein one of the service interruption factors is that the diameter of a pipe segment is less than a threshold value.

67. An apparatus according to claim 66 wherein the threshold value is 4 inches.

68. An apparatus according to claim 57 wherein one of the service interruption factors is that more than a specified number of customers of the water distribution system were affected by a maintenance task.

69. An apparatus according to claim 68 wherein the specified number of customers is 10.

70. An apparatus according to claim 57 wherein one of the service interruption factors is that a pipe segment had to be shut off for more than a specified period of time during the performance of a maintenance task.

71. An apparatus according to claim 70 wherein the specified period of time is 4 hours.

72. An apparatus according to claim 57 wherein one of the water quality factors is that a hydrant has less than a specified flow rate for a particular street or pipe segment.

73. An apparatus according to claim 72 wherein the specified flow rate is 700 gallons per minute.

74. An apparatus according to claim 57 wherein one of the water quality factors is that a hydrant has a chlorine residual that is less than a specified range.

75. An apparatus according to claim 74 wherein the specified range is based on the distance and flow rate between the hydrant and a chlorinating source.

76. An apparatus according to claim 57 wherein one of the water quality factors is the number of discolored water complaints received for a particular street or pipe segment.

77. An apparatus according to claim 57 wherein one of the water quality factors is the number of pressure complaints received for a particular street or pipe segment.

78. An apparatus according to claim 57 wherein one of the service interruption factors is that a pipe segment is made from a particular material.

79. An apparatus according to claim 78 wherein the material is galvanized steel.

80. An apparatus according to claim 78 wherein the material is transite.

81. An apparatus according to claim 57 wherein one of the service interruption factors is that a number of people required to perform a pipe segment break exceeds a specified value.

82. An apparatus according to claim 57 wherein one of the service interruption factors is that a pipe segment is installed in a county or state road.

83. An apparatus according to claim 57 wherein one of the service interruption factors is that a street which was excavated in order to perform a pipe segment repair is made from concrete or brick.

84. An apparatus according to claim 57 wherein one of the service interruption factors is that a pipe segment is installed in soil that is aggressive.

* * * * *

UNITED STATES PATENT AND TRADEMARK OFFICE
CERTIFICATE OF CORRECTION

PATENT NO. : 6,839,641 B1
DATED : January 4, 2005
INVENTOR(S) : Kevin R. Kirwan It is certified that error appears in the above-identified patent and that said Letters Patent is hereby corrected as shown below:

Title page,
Item [73], please include the assignment information as follows:
-- Assignee: American Water Works Company, Inc., Voorhees, New Jersey --.

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,839,641 B1  Page 1 of 1
APPLICATION NO. : 09/668081
DATED : January 4, 2005
INVENTOR(S) : Kevin R. Kirwan

It is certified that error appears in the above-identified patent and that said Letters Patent is hereby corrected as shown below:

Title page (73), please include the assignment information as follows:

-- Assignee:  American Water Works Company, Inc., Voorhees, New Jersey --.

Signed and Sealed this

Sixth Day of May, 2008

JON W. DUDAS
*Director of the United States Patent and Trademark Office*